June 26, 1945.　　　　A. J. ALCANTARA　　　　2,378,966
WAVE MOTOR
Filed May 28, 1943　　　　4 Sheets-Sheet 1

INVENTOR.
ARMANDO J. ALCANTARA
BY
ATTORNEY.

June 26, 1945.   A. J. ALCANTARA   2,378,966
WAVE MOTOR
Filed May 28, 1943   4 Sheets-Sheet 3

INVENTOR.
ARMANDO J. ALCANTARA
BY
ATTORNEY.

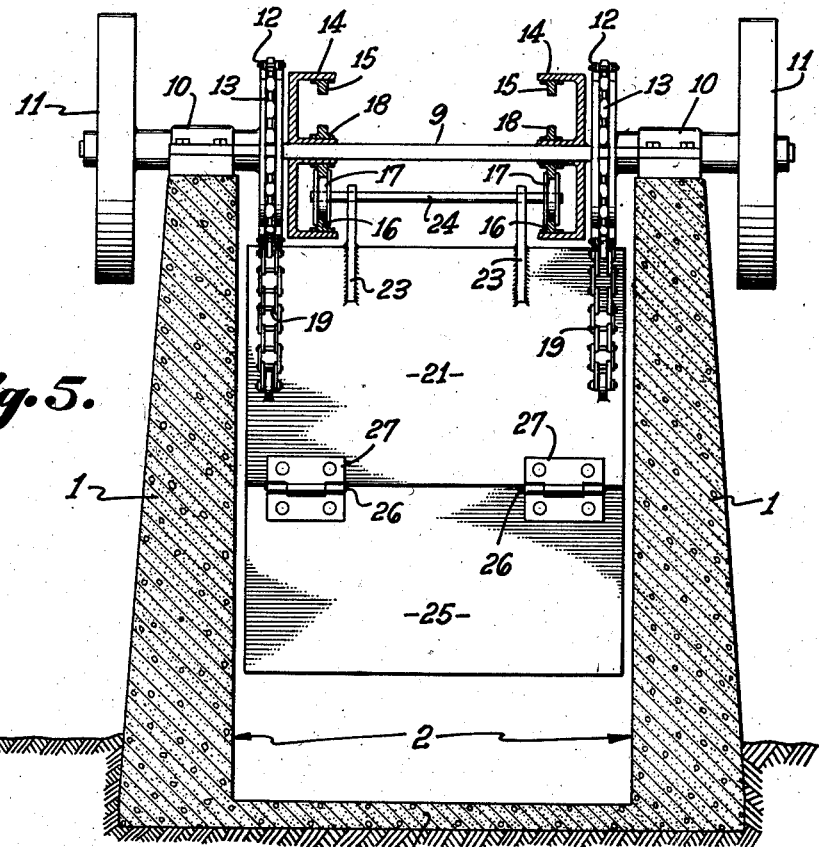
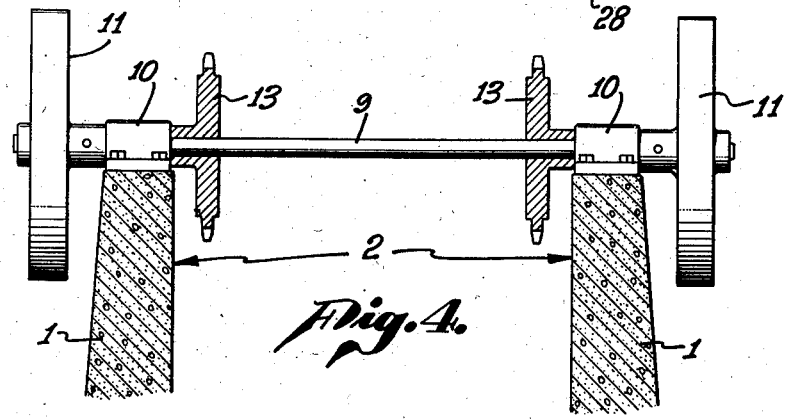

Patented June 26, 1945

2,378,966

UNITED STATES PATENT OFFICE 2,378,966

WAVE MOTOR

Armando J. Alcantara, Yermo, Calif.

Application May 28, 1943, Serial No. 488,814

16 Claims. (Cl. 61—20)

My invention comprehends the provision of a type of wave motor including a shore structure erected on the sea shore and providing a channel extended shorewardly from the sea and having a funnel shaped mouth open at its ocean side, in which channel a plurality of vanes are mounted at intervals on and carried by a continuously operative conveyor for successive disposition and movement shorewardly through the channel in an operative cycle, against which the force of the waves and undulations generated by the movement of the sea operate to produce and maintain a substantially continuous movement of the conveyor in one direction and through the medium of the conveyor, serves to impart corresponding motion to a driven element.

An object is to so construct the mechanism as to utilize a maximum of the power of the waves and to convert the intermittent impulses into rotary motion by any suitable means. In order to accomplish such results it is necessary to mount the vanes on one or more continuously operating chains disposed substantially above the level of maximum high tide so that during their traverse of the channel shorewardly in an operative cycle the vanes will present a maximum area to the inflowing water, and upon completion of an operative cycle move in the direction of the inlet of the channel in an inoperative cycle, and thence downwardly into successively new positions at the beginning of subsequent operative cycles.

Another object is to provide an outlet for the water at the shore end of the channel through which the water must be discharged during operative cycles of the vanes and prevented from back-flowing through the channel in the direction of the inlet and thus impeding if not actually nullifying the usefulness of the vanes.

Other objects will appear as the description of my wave motor progresses.

I have shown a preferred form of mechanism embodying the invention in the annexed drawings, subject to modification, within the scope of the appended claims, without departing from the spirit of the invention. In said drawings:

Fig. 4 is a sectional elevation on line 4—4, and Fig. 5 is a sectional elevation on line 5—5, of Fig. 1.

Figure 1:
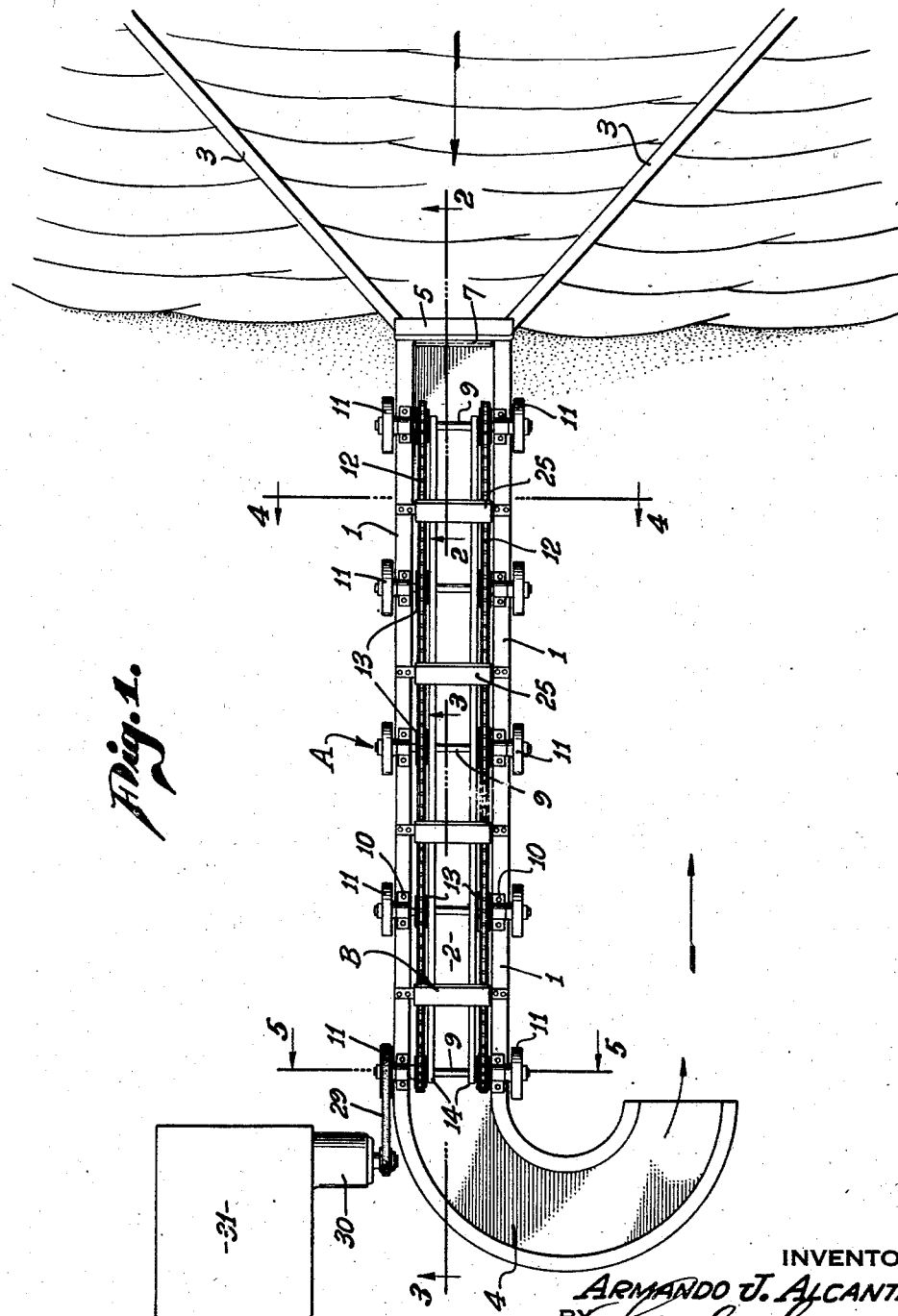
Fig. 1 is a top plan view of the aforesaid mechanism arranged as a unit on the seashore.
Figure 2:
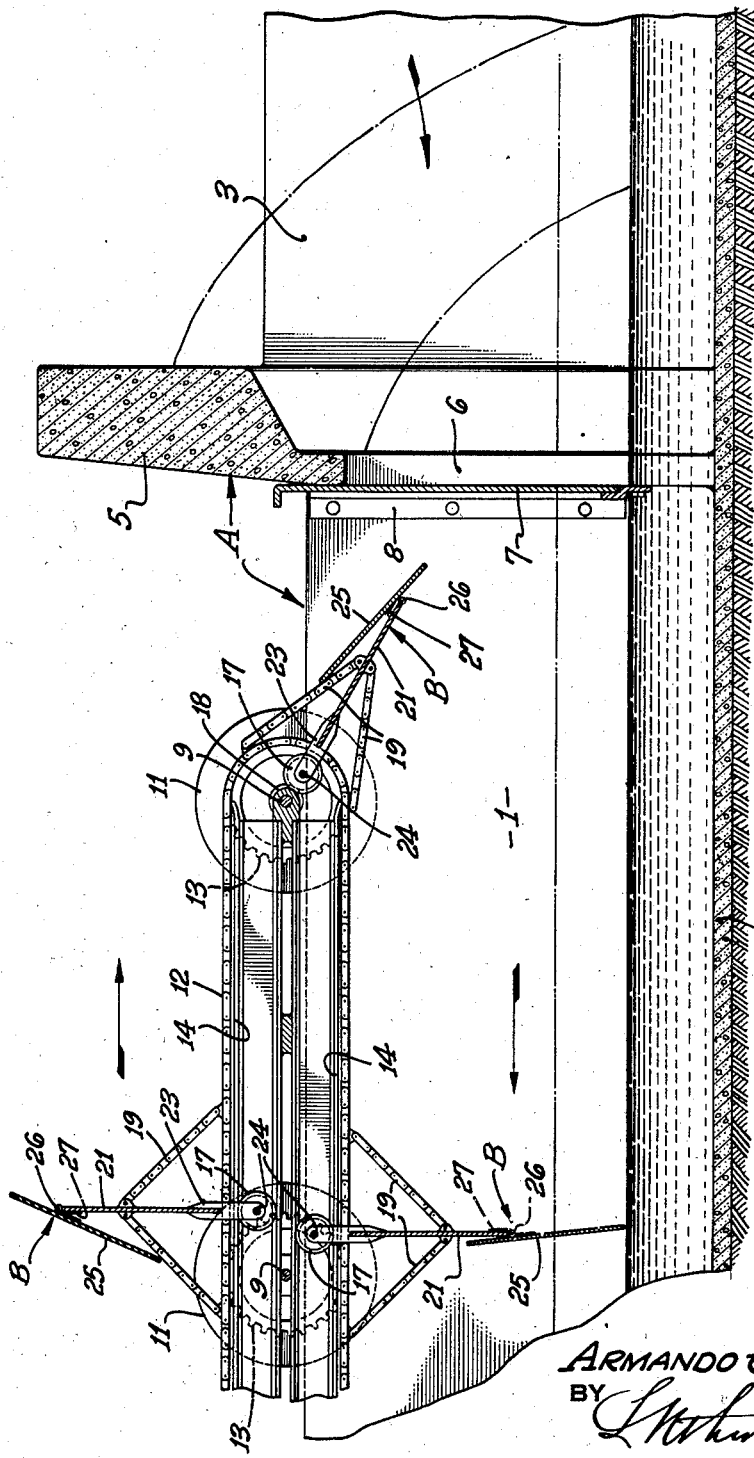
Fig. 2 is a sectional elevation on line 2—2 of Fig. 1 showing the inlet end of the structure and mechanism.

Briefly described, my improvements include a structure generally indicated at A (Fig. 1) adapted to be erected on the shore of a sea and having a pair of spaced walls 1, 1 of reinforced concrete or other material, extending shorewardly from the shore line, between which a channel 2 is formed leading from a flared mouth 3 to a curved outlet 4 arranged to direct the discharged water back to the sea. Said outlet 4 is usually disposed at an elevation and position on the shore above, at or near the line of maximum high tide. At the junction of channel 2 and mouth 3 I provide a transverse wall 5 with an inlet 6 therein adapted to be closed by a vertically openable gate 7 arranged to slide in lateral guides 8, 8 (Fig. 2).

On the tops of walls 1, 1 I mount a plurality of transverse parallel shafts 9 which are carried in suitable bearings 10 and each shaft has a pair of fly wheels 11, 11 on the opposite end portions thereof externally of the walls 1. A pair of conveyor chains 12, 12 are carried on laterally positioned sprockets 13, 13, etc. fixed to shafts 9 so that the conveyor chains will continuously move over said sprockets from the foremost to the rearmost of the shafts 9 as well as the intermediate sprockets and shafts.

Inwardly of but closely adjacent the opposite sprockets 13, 13 on each shaft 9 I provide a pair of stationary tracks 14, 14, of shallow channel cross section which extend the full length of the structure and have upper and lower ribs 15 and 16, respectively, formed on the adjacent flanges of the tracks, over which ribs grooved rollers 17 are adapted to move as the conveyors operate. Said rollers are connected with the chains 12 as hereinafter described. Each shaft 9 carries rollers 18 alined with the ribs 15 and 16 on the sides of the structure and have annular ribs which engage the annular grooves of the rollers 17. Thus, the rollers 17 in their traverse of the tracks move on the ribs 15 or 16, as the case may be, depending upon whether the rollers are moving shorewardly in an operative cycle, or seawardly in an inoperative cycle or over rollers 18 during changes from one of said cycles to the other. The tracks are not necessarily extended around the ends of the conveyor but may be open inasmuch as the rollers 17 will follow the rollers 18 at the ends of the conveyor.

At desired intervals throughout the length of the conveyor impeller units B are attached to the chains 12 and connected with pairs of the rollers 17. Angularly disposed chains 19, 19, are fixed to chains 12 at 20, 20, and to the upper sections 21 of units B as at 22, 22. Sections 21 have a pair of arms 23, 23, extended from an edge thereof and are adapted to embrace a transverse shaft 24 on which the pair of rollers 17, 17 of each unit is carried, as shown in Fig. 4. Each unit B includes a foldable vane 25 which is hinged at 26 to a substantially rigid section 21 as by means of a suitable hinge, or hinges 27, so that the vane 25 may be folded upon the section 21, as shown at the top of Fig. 3, when the units B are moving seawardly in an inoperative cycle.

Figure 3:
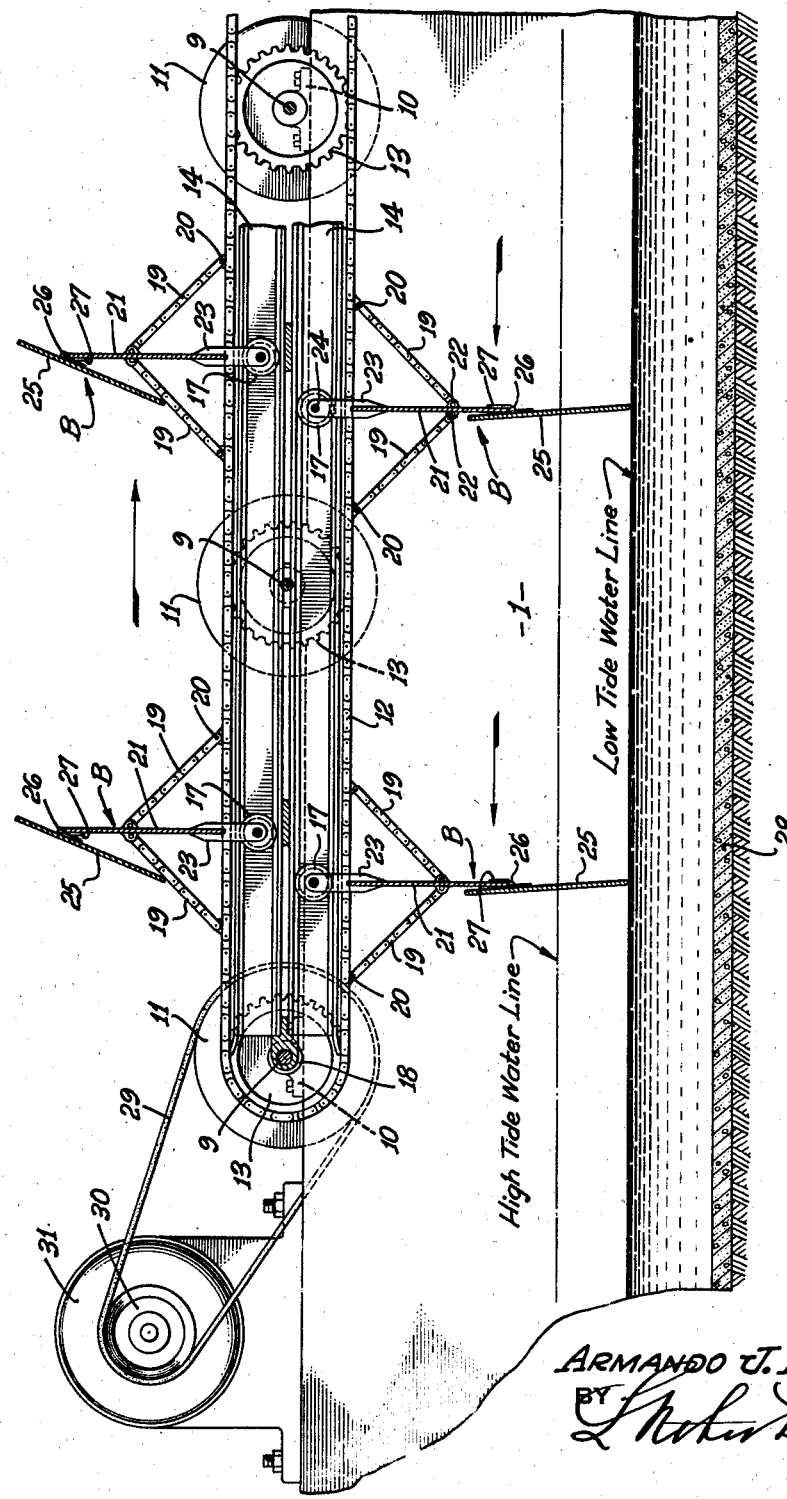
Fig. 3 is a similar elevation on line 2—2 and showing the shore end of the mechanism, in continuation of the structure of Fig. 2.

When the units B are moving shorewardly in an operative cycle, as shown at the bottom of Fig. 3, the portions of vanes 25 above the hinge axes 26 will be forced against the depending portions of sections 21 both by gravity and by pressure of the water against the portions of the vanes below the hinge axes. When, however, the units B move upwardly at the shore end of the conveyor for return movement in the direction of the sea, the force of gravity operates to fold the vanes 25 into the uppermost positions shown in Fig. 3. Likewise, at the sea end of the conveyor gravity operates to unfold the vanes and lower them into operative position for a succeeding operative cycle.

Preferably, the combined areas of the section 21 and the associated vane 25 are as nearly as possible equal to the area of the channel 2 in which successive waves of the sea are effective for impelling the vanes shorewardly, except for necessary clearance at the sides and bottom of the vanes. It is designed that the bottom 28 of channel 2 should be disposed to a sufficient depth below mean low tide level in order that the lower portions of the vanes at least will be either normally submerged or subject to the effect of the shorewardly moving water which is delivered to the channel through the wide open mouth 3.

The series of fly wheels 11 serve to maintain sufficient momentum at each succeeding impulse so that the vanes will not offer resistance to the water pressure or settle into a state of inertia which would have to be overcome before movement of the vanes could ensue. The water from the sea, as is obvious, is discharged through the curved land end of the channel. Hence, there can be no back flow of water in the channel to impair the movement of the vanes continuously in a single direction. As shown in Fig. 1, one of the fly wheels 11 or a sprocket associated therewith may be connected as by means of a chain or belt 29 with a motor 30 or a driven shaft of a transmission mechanism 31. The power may, therefore, be taken from the conveyor for the purpose of generating electricity or for directly driving a transmission means.

Briefly summarizing the operation of my wave motor it may be understood that the vanes 21—25 of units B travel continuously in one direction, but slightly less than one half of their travel occurs during an operative cycle as they traverse the channel 2 in a shorewardly direction, while on a return inoperative cycle, they move seawardly for a corresponding distance, during which return cycle the sections 25 are folded downwardly over the sections 21. During the operative cycle the surge or wash of the waves or undulations of the sea impel the units B shorewardly in successive impulses and, due to the momentum established and maintained by the fly wheels 11, the tendency of the conveyor to which the units B are attached is to continuous movement, thereby moving other units B, successively into position for continuing an operative cycle.

By reference to Fig. 3 it will be observed that the lowermost edges of the vanes 25 are approximately level with the low tide water line, i. e. the normal level of the water in channel 2 at moments of rest between successive waves. Thus, the vanes do not plough through the water in their traverse of channel 2, and slight if any resistance is offered to the shoreward movement of the vanes. Each succeeding wave or undulation, therefore, surges against the vanes 21 and 25 as the vanes are successively moved into position at the seaward end of channel 2. It is believed that the force of a wave against the seaward vanes will be expended and relieved by the forward movement of the vanes to an extent that no back pressure can result from each impulse. However, if any such back pressure should prevail the net result of each impulse will far exceed the counter pressure.

Obviously the surface forces which tend to actuate the vanes of units B will create undulations in the water below the low tide water line and will, of course, cause a shoreward movement of the water therebelow in the direction of the outlet 4. Thus all surplus water will be discharged through said outlet into the sea.

The entire mechanism may be truly horizontal, as shown, or it may be inclined to a desired extent to correspond to or vary from the natural slope of the shore. If inclined, the foremost vanes may even be slightly submerged in the water below the water line in channel 2, or otherwise, depending upon conditions, in order that the maximum force of each wave may be directed against the vanes in succession and to a lesser extent against the leading vanes.

An important feature of the invention consists in the manner of mounting the vanes on the chains 12. Were it not for the tracks 14, rollers 17 and 18 and shafts 24 to which the units B are attached, the looseness of chains 12 would but insecurely hold the vanes and the chains would be likely to whip to a more or less extent during the operation of the motor. The vanes being rigidly carried on the tracks prevents sagging of chains 12 and the flexible (or rigid) braces 19 connecting the fixed sections 21 with the chains 12 prevents undue lost motion of the vanes 26 and yet supports the sections 25 in sufficiently rigid positions during the operative cycles for withstanding the forces of the waves and the utilization of power derived therefrom.

The length of the structure may be varied in accordance with conditions at different locations. It is desirable and greater efficiency is had by so arranging the vanes and the length of the structure as to provide ample and sufficient means whereby two or more power impulses may be utilized at any moment during the traverse of the vanes through the channel.

The walls 3 at the mouth of the channel are sufficiently flared so as to maximize the effect of succeeding waves and undulations and to direct such movements of the water into the restricted channel 2. Thus, waves of given height and effect would be necessarily of greater height and effect when thus directed into the channel. Also, the angular walls 3 prevent waves which would oppose the free discharge of water from outlet 4.

What I claim is:

1. A wave motor comprising: a shore structure having a channel with guide wall elements converging shoreward from the sea and an outlet leading seawardly from said channel, a wave actuated mechanism including a plurality of impeller units including vanes movable shorewardly in said channel in the first part of an operative cycle and seawardly above said channel in a second part of said operative cycle, and means including a belt member connected with said vanes and a plurality of fly wheels operatively connected with said belt member for converting successive impulses created by the impingement of water upon said vanes into continuous rotary motion.

2. A wave motor comprising: a shore structure having a channel with guide wall elements converging shoreward from an inlet to the sea and an outlet apart from said inlet, a wave actuated mechanism including a plurality of extensible impeller units including vanes movable shorewardly in said channel when extended and seawardly when retracted, and means including a vane connected belt and fly wheels operatively driven by the shoreward movement of said vanes inwardly from the inner end of said belt tending to convert successive impulses created by the impingement of water admitted to said channel upon said vanes into continuous rotary motion, said channel having a reversely directed outlet portion positioned, whereby water admitted through said inlet is caused to be discharged through said outlet.

3. A wave motor as characterized in claim 1 including: continuous belt means moved by vanes throughout the operative and inoperative portions of said cycle.

4. A wave motor of the character described in claim 1 including: continuous conveyor means for movably holding said vanes in positions to be moved by waves, and rigid tracks for guiding and supporting said vanes during the operative and inoperative portions of said cycle.

5. A wave motor as characterized in claim 1 including: continuous conveyor means carried by said structure for movably supporting said vanes, said impeller units being formed of pairs of sections at least one of which in each unit is foldably supported on a rigid section during an inoperative portion of a cycle and is extensible into an operative plane substantially paralleling that of the rigid sections throughout an operative portion of a cycle.

6. A wave motor as characterized in claim 1 including: continuous conveyor means carried by said structure for movably supporting said impeller units, each of said units being formed of a rigid section and a relatively foldable vane supported on the rigid section and adapted to be folded during an inoperative portion of a cycle and extensible into operative position throughout an operative portion of a cycle, and auxiliary supporting means for supporting the rigid sections throughout their operative and inoperative portions of said cycles.

7. A wave motor comprising: A shore structure having a channel disposed at right angles to the shore line and open to the sea at one end and of arcuate form at its shore end with an outlet facing the sea and so arranged as to prevent any considerable back-flow of water through said channel, an endless flexible conveyor carried by said structure and including a plurality of vanes depending for a substantial extent of their travel into the water of the channel and movable through the channel only in a shoreward direction and when in operative positions with and by the water passing through said channel, and means operable by said conveyor for imparting substantially continuous rotary motion to a driven element.

8. A wave motor comprising: A shore structure having a channel disposed at right angles to the shore line and open to the sea at one end and an outlet facing the sea and so arranged as to prevent any considerable back-flow of water through said channel, an endless flexible conveyor carried by said structure and including a plurality of vanes depending for a substantial extent of their travel into the channel and movable through the channel only in a shoreward direction and when in operative positions with and by the water passing through said channel, and means operable by said conveyor for imparting substantially continuous rotary motion to a driven element, said vanes having hinged foldable sections adapted to be folded upon the completion of an operating cycle and to remain folded throughout a return cycle until they attain positions for a succeeding operating cycle.

9. A wave motor comprising: A shore structure having a channel open to the sea at one end and a curved outlet at its shore end so arranged as to prevent any considerable back-flow of water through said channel, an endless conveyor carried by said structure and including a plurality of foldable vanes depending into the channel and movable shorewardly in the channel when in operative positions with and by the water passing through said channel and thence seawardly in a plane above the channel while folded, and means operable by said conveyor for imparting substantially continuous rotary motion to a driven element, a stationary track having an extent at least aproximating the effective length of an operating portion of a cycle, and means adapted to transverse said track for guiding and holding said vanes in both the operating and return cycles of movement.

10. A wave motor comprising: A shore structure having a channel open to the sea at one end and a curved outlet at its shore end so arranged as to prevent any considerable back-flow of water through said channel, an endless conveyor carried by said structure and including a plurality of foldable vanes depending into the channel and movable shorewardly in the channel when in operative positions with and by the water passing through said channel, and thence seawardly in a plane above the channel while folded, and means including a plurality of fly wheels operable by said conveyor for imparting substantially continuous rotary motion to a driven element, said vanes having hinged foldable sections adapted to be folded upon the completion of an operating portion of a cycle and to remain folded throughout a return portion of a cycle until they attain positions for beginning a succeeding cycle, and diagonal braces connecting corresponding sections of said vanes with said conveyor whereby such sections may be held substantially stationary while the associated sections thereof are foldable relative thereto, as described.

11. A wave motor comprising: a shore structure having a channel extending shorewardly from an inlet at one end and having a curved outlet for the admitted water at its shore end so formed as to direct the water from the channel outwardly to the sea without retraversing the channel, an endless conveyor movably supported on said structure above the line of maximum high tide and equipped with a plurality of foldable vanes disposed transversely of the channel and adapted to traverse channel for an operative working movement in the direction of the shore while unfolded and depending from the conveyor into the channel so as to receive impulses from the admitted water and to move in the direction of the sea while folded during a return movement, said vanes being movable continuously in a given direction.

12. A wave motor as characterized in claim 11 including: a rigid track for guiding said vanes in the traverse of the channel during successive cycles.

13. A wave motor comprising: a shore structure having a channel closed on each side and extending shorewardly from a flared inlet at its outer end and having an outlet for the admitted water at its shore end so curved as to direct the water from the channel outwardly to the sea with a minimum flow resistance and without retraversing the channel, an endless flexible conveyor movably supported on said structure above the line of maximum high tide, a plurality of foldable vanes disposed transversely of the channel and adapted to traverse the channel in an operative portion of a cycle only in the direction of the shore while in the channel so as to receive impulses from the admitted water and to move in the direction of the sea in a plane paralleling but above the channel during a return portion of the cycle, said conveyor being connected directly with momentum operated means to make said conveyor movable continuously, a stationary track on said structure, rollers operable on said track, means connecting said vanes with said rollers, and means for connecting said vanes with said conveyor, for operably supporting the vanes and moving said conveyor during different portions of a cycle of operation.

14. A wave directing structure for use with water power machinery to be driven by a succession of waves moving shorewardly; said structure including two channel forming walls disposed transversely to the shore line and substantially parallel one to the other, a seawardly flared extension for each of said walls, and a shoreward extension of said walls having a curved form so that its outlet opens toward the sea for the purpose set forth.

15. The structure as characterized in claim 14 having the channel forming walls constructed and arranged for mounting water power machinery to be unidirectionally acted upon by wave water passing through the said channel.

16. Water power machinery to be driven by water moving in a channel below it; said machinery including at least one continuous sprocket belt disposed in a vertical plane above the channel, a succession of vanes connected to said belt to dip therefrom into the water in the channel and to move said belt as said vanes are moved by action of the water, and momentum storing devices connected to said belt and operable thereby, and to cooperate in moving said belt continuously during intervals between wave impulses whereby said machinery may operate at a substantially uniform speed, an additional belt disposed in parallel relation to said first named belt, a continuous track between the lower and upper stretches of said belt, rolling members movable along said track, and a connection between said members and said vanes for holding the vanes in operative positions in said channel.

ARMANDO J. ALCANTARA.